Aug. 15, 1961 P. LEBOIME 2,995,989
WORK POSITIONING SYSTEM FOR MACHINE TOOLS
Filed Nov. 19, 1959
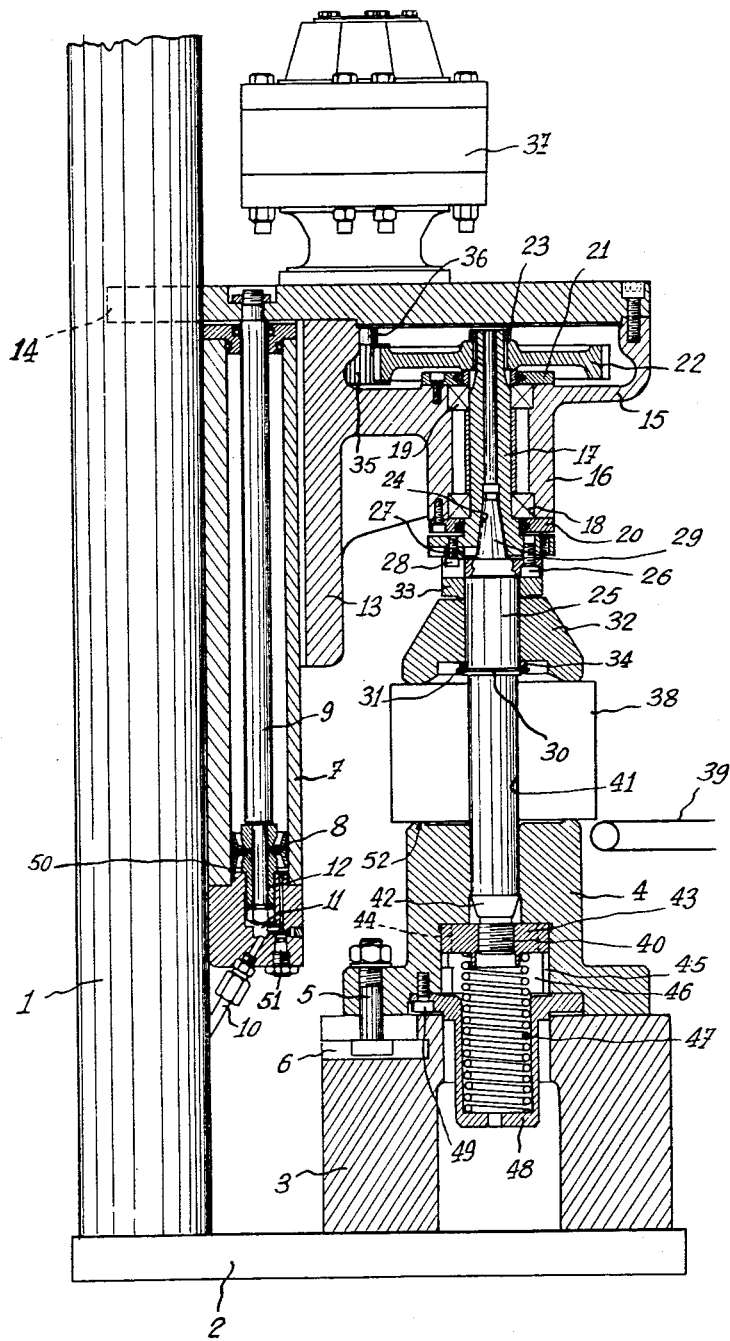

United States Patent Office

2,995,989
Patented Aug. 15, 1961

2,995,989
WORK POSITIONING SYSTEM FOR MACHINE TOOLS
Pierre Leboime, Paris, France, assignor to Societe Anonyme des Engrenages Minerva, Neuilly-sur-Seine (Seine), France, a society of France
Filed Nov. 19, 1959, Ser. No. 854,201
Claims priority, application France Nov. 21, 1958
15 Claims. (Cl. 90—59)

This invention relates to machine tools and more especially to improved means for positioning workpiece blanks thereon.

In certain types of machine tools, and foremost in gear-cutting machines, it is required that a generally annular workpiece blank be securely supported about a vertical spindle passed through a central bore or recess in the blank preparatory to the performance of desired machining operation, such as gear teeth cutting, upon the outer surface of the blank. When the machine tool forms part of an automatic machine tool system in which a large series of similar parts are to be passed through a predetermined sequence of machining steps in automatic or semi-automatic manner, the afore-mentioned work positioning means usually comprise a centrally bored base block to the flat upper face of which the blanks are fed laterally as from the output end of a conveyer belt leading to said base block so that the successive blanks are positioned on the base block with the central bore of the blank in approximate register with the bore in the base block. Thereafter the vertical spindle is lowered from a retracted upper position, down through the bore in the blank and the base block, as by a suitable fluid actuator system, and a vigorous downward pulling force is applied to the lower end of the spindle projecting below the base block until the blank has been securely clamped between the said upper surface of the base block and a cooperating flat under surface of an abutment member carried by the spindle. The operation of the conveyer means fluid-operated spindle actuator, and spindle pulling means are synchronized into a programmed timed sequence with the actual machining operations performed on the blank.

In prior systems of this kind the axial force applied to the spindle in the final stage of its downward motion in order to effect a firm clamping of the blank in working position has in some cases been achieved by the use of pivoted spiral cams or the like cooperating with a lower end portion or nose of the spindle below the base block and a mechanical connection was provided to actuate such cams at the proper times in order to apply the desired downward pulling force to the spindle.

These and other similar systems heretofore used in clamping the work blank in position on its spindle have suffered from various drawbacks. First, they required comparatively complex mechanism for operating the force-exerting means in timed relation with the other steps of the sequence, and such mechanism increased the size and manufacturing and maintenance cost of the system while decreasing its reliability. Thus, with the use of cams as mentioned above, even slight maladjustment in the cam profile and/or setting would affect the final clamping pressure exerted on the blank so that such pressure was liable to sustain unpredictable and objectionable variations from part to part in a series. Moreover, in view of the intricacy of the mechanical connections involved it was not practicable to provide a range of interchangeable differently dimensioned mechanisms as would be required for handling differently sized blanks which obviously required correspondingly different clamping pressures.

An object of this invention is to provide a work blank positioning and clamping system of the type described, which will be considerably simpler, and hence cheaper, more reliable and generally more efficient than those heretofore provided for similar purposes. Other objects are to provide such a system that will only require the replacement of a few simple, readily accessible parts in order to adapt it to blanks over a wide range of sizes and to a wide range of clamping pressures; wherein the clamping pressures will be constant and faithfully reproducible throughout a manufacturing series; which will be readily adaptable to existing machines without considerable changes in the latter; and which will be especially well suited for use in fully automatic machining processes.

In achieving the above and further objects the invention broadly makes use of a novel combination of a screw-and-nut device, or equivalent helical drive arrangement, with axially retractible work-clamping spindles of the type specified, in order to develop and apply to the spindle the high axial thrust required in the last stage of a work positioning operation.

An exemplary embodiment of the invention will now be described for purposes of illustration but not a limitation with reference to the accompanying drawing, which is a vertical view, mostly in section by an axial plane, of a blank positioning system embodying the improved clamping means of the invention.

As shown the system is associated with any desired type of machine tool having a base plate 2 and a vertical column 1 upstanding from it. Secured on the base plate 2 is a permanently attached base block 3 and secured to this by way of bolts 5 having their heads engaged in slots 6 near the top of the block 3 is a removable base block 4. It will be understood that the removable mounting of the upper base block 4 as described permits quick replacement thereof in case the dimensions of the blanks such as 38 to be mounted thereon are changed.

Secured to a side of column 1 is an hydraulic actuator cylinder 7 in which a piston 8 secured on a piston rod 9 is slidable. The actuator here shown is of the single-acting type, with a fluid pressure connection 10 at the lower end of the cylinder leading into an end chamber 11 into which a lower extension 12 of piston rod 9 can project for reasons to be later made clear. Application of fluid pressure from any suitable source through connection 10 will thus raise the piston and extend the piston rod 9 upwardly, while the downstroke of the piston rod is here produced by gravity. Obviously however a double-acting cylinder may be used if desired, with a pressure connection to its upper end in addition to the lower connection 10.

The upper end of rod 9 above the cylinder is secured to a carrier 13 adapted for vertical reciprocation along column 1 and having guide arms 14 engaging the sides of the column for guiding it in such reciprocation. Secured to the under side of the carriage 13 is a casing 15 having a downwardly extending cylindrical extension 16 generally coaxial with the axis of base 4. Within casing extension 16 is mounted a vertical shaft 17 journalled in the casing by way of the anti-friction bearings 18 and 19 and extending out of the casing portion 16 at its lower and upper ends through annular seal bearings 20 and 21. Keyed to the upper end of shaft 17 within the casing 15 and retained by a nut 23 is a gear 22 which meshes with a drive pinion 35 driven from any suitable rotary motor means, such as a rotary hydraulic motor 37 mounted on the top of carrier 13.

The lower end of shaft 17 is formed with an enlarged head having a flared frustoconical recess 24 formed in it for removably receiving the correspondingly tapered upper end 29 of a vertical spindle 25, which is the work clamping spindle previously referred to. The spindle 25 may be secured for rotation with the shaft 17 by way of two or more screws such as 26 connecting an upper flange of the spindle 25 with a lower flange at the bottom end of shaft 17. Moreover, one or more driver claws such as 27, secured with screws 28, may project from the lower end face of the flange on shaft 17 for driving engagement with claws projecting from the top of a flange at the upper end of spindle 25, or an intermediate part attached thereto to permit readier replacement of the spindle. Rotatably mounted about the spindle 25 below its connection with shaft 17 is an annular clamping ring 32 which is retained on the spindle by means of a snap-ring 31 inserted in a groove 30 of the spindle, and the clamping member 32 being rotatable between a lower ring 34 inserted between it and snap-ring 31, and an upper ring 33. It will be noted that the rings 33, 34 are provided with restricted areas of engagement with the clamp member 32.

It will be understood that with the arrangement described, the spindle 25 will be driven in rotation from motor 37 through the step-up gearing 35—22, regardless of the vertical position of the assembly comprising carrier 13 and attached components, which position is determined by means of actuator 7.

The blank 38 that is to be machined on its peripheral surface, e.g., to have gear-teeth cut on it, is fed in to the system laterally by any appropriate conveyer arrangement, here shown schematically as a conveyer belt 39. Prior to the time that a blank 38 has been delivered by the conveyer 39, the actuator 7 has been operated to raise the vertically movable assembly including carrier 13 to a sufficient altitude such that the lower end of spindle 25 is clear of the top of the blank 38 to be delivered.

It will be understood that the blank 38 need only be positioned upon base 4 in an approximately coaxial registering relation with said base and with spindle 25, since accurate centering will be obtained in a manner to be presently described. With a blank 38 thus approximately positioned, the actuator 7 is operated, for example simply by exhausting fluid from its bottom connection, so that the carrier and spindle assembly moves downwards by the effect of gravity (or by the application of pressure fluid to the upper end of the cylinder in case of a double-acting actuator).

The spindle 25 at its bottom end includes a tapered section 42 followed by a screw threaded end or nose section 40 of lesser diameter than the main body of the spindle. Thus this lower end of the spindle 25 penetrates readily into the top of the bore 41 in the blank even though the blank may not be accurately aligned therewith, and the taper section 42 then acts to center the blank into accurately aligned position upon the base block 4. As the spindle 25 proceeds on its downward path its end portion passes through the bore in the blank 38 then through the coaxially aligned bore in the base block 4 and finally the screw nose 40 at the lower end of the spindle projects into a chamber 46 formed in the block 4. Mounted in this chamber is a nut member 43 which is prevented from rotating with respect to the block but allowed some freedom of vertical axial movement in it by means of cooperating splines 45 on the nut and block. A powerful compression spring 47 having its lower end seated in the bottom of a hat-shaped seat member 48 screwed to the block 4 at 49 acts against the under side of nut 43 to thrust it upwards against a shoulder in the block 4.

The threads in nose member 40 of the spindle and the nut 43 are complementary and their common pitch direction is such that as the spindle 25 is rotated by motor 37 while being moved downwards with the piston rod 9, the screw nose 40 engages and screws into the non-rotatable nut 43. Normally the relative velocities of the spindle rotation and downward bodily movement of the spindle and the screw pitch of parts 40—43 may be so correlated with one another that the screwing action exerts a downward thrust resulting in a slight downward movement of nut 43 along its splineways while compressing somewhat the spring 47.

Thereafter as the actuator piston reaches the lowermost point of its stroke so that the spindle 25 now revolves without any downward axial component of motion, the nut 43 is slowly pulled up again by the screwing action until it is restored to its normal abutting position. In any case, there necessarily comes a time when the assembly comprising the blank 38 and block 4 are securely clamped against each other between the nut 4 on one side and clamping ring 32 on the other. The final axial clamping pressure applied to the blank depends only on the pitch of the screw threads in the parts 43—40, the step-up ratio of gearing 35—22, and the maximum torque developed by motor 37; preferably suitable adjustable torque limiting means, not shown, may be provided to limit the motor torque to a predetermined value.

In order to retard the rate of downward movement of the spindle assembly in a final stage of such movement and thus prevent undesirable impacts between the screw nose 40 and nut 43, and also to adjust the final rate of descent, hydraulic damping means are provided one suitable embodiment of which will now be described. Downward extension 12 of piston 8 is adapted, as the piston 8 reaches a predetermined position approaching the lowermost end of its downstroke, to penetrate into an axial recess 11 in the lower cylinder head, extension 12 being a close sliding fit in said recess. The lower end of recess 11 has the pressure connection 10 opening into it, and is further connected through a restricted duct controlled by an adjustable needle valve 51 with the lower end of the main cylinder recess. Thus, when piston extension 12 enters recess 11 the all-but-sealed chamber 11 defined below the piston serves to control the rate of further descent of the piston at a value determined by the rate of leakage of fluid through the restricted duct as adjusted with valve 51. Thus valve 51, in that it permits accurate control of the final rate of descent of the spindle during the screwing engagement of screw stud 40 with nut 43, makes it possible to achieve a fine correlation between the axial component velocity of the screwing motion and its rotational component velocity as determined by the motor 37.

After one series of blanks, such as gear blanks, has been machined, the system of the invention can very easily and quickly be altered to accept another and differently dimensioned series, by simple replacement of a few readily accessible parts of the system. Assuming for example the new series is smaller both in diameter and axial length than the former series, the base block 4 would be removed by unscrewing the bolts 5 and instead a similar block would be mounted having a smaller-diameter bearing surface 52, and the clamping ring 32 would be removed by withdrawing snap-ring 31 and another clamping ring having a smaller effective diameter and a longer axial length would be mounted in its place. If a change in the inner bore diameter of the blanks is to be desired, then it would simply be necessary to replace the spindle 25 and possibly the nut 43.

It will be understood that various modifications may be made in the single embodiment illustrated and described without departing from the scope of the invention. Thus the spindle 25 instead of being retracted in an upward direction to clear the path of blank delivery and being made to enter the blank and base block downwardly from the top, might have its movement reversed, so as to be retracted downwardly below the baseblock and moved upwardly into operative position first through the base-block and then through the blank. In such case the cooperating screw and nut device of the invention could be provided at the upper end of the spindle. Further an equivalent arrangement may be conceived wherein the spindle is not rotatable, and the screw stud at the end of the spindle would then be made to cooperate with a nut member similar to 43 but driven in rotation by any suitable means. Also, the relative relationship between the screw and nut components of the screw-and-nut arrangement may well be reversed. The sources of power for imparting the respective component displacements motions involved, i.e. axial displacement and rotation, may be other than the fluid pressure actuator and hydraulic rotary motor shown.

What I claim is:

1. In a machine tool a system for positioning an axially-recessed blank comprising a frame, a baseblock secured on the frame and having a vertical recess therein and a generally horizontal top, means for delivering blanks in succession to the top of the block, each blank forming with said block a pair of parts positioned with their recesses generally aligned with each other, a vertical spindle mounted for movement along a vertical path in alignment with the block recess axis between an operative position wherein the spindle extends through both aligned recesses in the pair of parts consisting of the blank and block with one end of the spindle projecting therebeyond, and a retracted position wherein the spindle is clear of the top of the block to permit delivery of a blank thereto, an abutting surface carried by the spindle for engagement with a cooperating surface of one part of said pair of parts in said operative spindle position, a screw-threaded element on said one end of the spindle, a complementarily threaded element positioned for abutting engagement with the other part of said pair of parts and for screwing engagement with said first threaded element in said operative spindle position, and means imparting relative rotation to said threaded elements in a direction to cause screwing engagement between them as the spindle approaches its operative position thereby to clamp said pair of parts firmly between said abutting surface and said second threaded element.

2. In a machine tool a system for positioning an axially recessed blank comprising a frame, a vertically-recessed baseblock thereon having a generally flat top, means for delivering blanks in succession to the top of the block with each blank positioned to have its recess generally aligned with the recess in the block, a vertical spindle mounted for movement along a vertical path in alignment with the block recess axis between an operative lower position wherein the spindle extends through both aligned recesses in the blank and block and a retracted upper position wherein the spindle is clear above the top of the block to permit delivery of a blank thereto, an abutting surface carried by the spindle for engagement with an upper surface of said blank in said operative spindle position, a threaded element on the lower end of the spindle, a complementarily threaded element positioned for abutting engagement with an under surface of said block and for screwing engagement with said first element in said operative spindle position, and means imparting rotation to one of said threaded elements relative to the other in a direction to cause screwing engagement between said elements as the spindle approaches its operative position thereby to clamp said blank and block firmly between said abutting surface and said second threaded element.

3. In a machine tool a system for positioning an axially-recessed blank comprising a frame, a baseblock secured on the frame and having a vertical recess therein and a generally horizontal top, means for delivering blanks in succession to the top of the block; each blank forming with said block a pair of parts positioned with their recesses generally aligned with each other, a vertical spindle mounted for rotation and for movement along a vertical path aligned with the block recess axis between an operative position wherein the spindle extends through both aligned recesses in the pair of parts consisting of the blank and block with one end of the spindle projecting therebeyond and a retracted position wherein the spindle is clear of the top of the block to permit delivery of a blank thereto, an abutting surface carried by the spindle for engagement with a cooperating surface of one of said pair of parts in said operative spindle position, screw threads formed at said one end of the spindle, a complementarily threaded nut element positioned for abutting engagement with the other of said pair of parts and for screwing engagement with said spindle screw-threads in the operative spindle position, and means for rotating the spindle in a direction to cause screwing engagement between said threads as the spindle approaches its operative position.

4. The system of claim 2, wherein said first threaded element comprises a screw threaded lower end portion of the spindle and said second mentioned threaded element comprises a nut, and wherein power means are provided for rotating said spindle in a direction to screw said spindle end portion into the nut.

5. The system of claim 1, comprising fluid actuator means for reciprocating the spindle on its vertical path.

6. The system of claim 2, including fluid actuator means for raising the spindle from its operative to its retracted position.

7. The system of claim 2, including fluid actuator means for raising the spindle from its operative to its retracted position, and for allowing said spindle to move under gravity from its retracted to its operative position.

8. In the system of claim 7, fluid damping means for adjustably retarding the descent of the spindle in a final stage as the spindle approaches its operative position.

9. In the system of claim 1, means yieldingly mounting one of said threaded elements for limited axial displacement.

10. In the system of claim 3, means yieldingly mounting said nut for limited axial displacement relative to said baseblock.

11. In the system of claim 1, taper means adjacent said one end of the spindle for centering cooperation with said blank as the spindle first penetrates the recess in the blank.

12. The system of claim 2, wherein said abutting surface forms part of an annular member removably mounted on the spindle for free rotation thereon.

13. In the system of claim 2, a vertical column, a carriage guided for vertical movement along the column, means supporting the upper end of the spindle in depending relation from said carriage for rotation with respect thereto, fluid actuator means on said frame for vertically reciprocating said carriage and motor means on said carriage connected for rotating said spindle.

14. In the system of claim 13, means for controlling the torque developed by said motor means.

15. The system of claim 3, wherein said spindle and said nut are mounted for ready replacement with other spindles and nuts within a range of sizes.

References Cited in the file of this patent

UNITED STATES PATENTS

| | | |
|---|---|---|
| 1,357,696 | Eberhardt | Nov. 2, 1920 |
| 2,327,920 | Moohl | Aug. 24, 1943 |
| 2,685,823 | Kaiser | Aug. 10, 1954 |
| 2,873,516 | McCain et al. | Feb. 17, 1959 |